A. HUTTON.
SAW.
APPLICATION FILED JULY 26, 1915.
1,181,529.
Patented May 2, 1916.
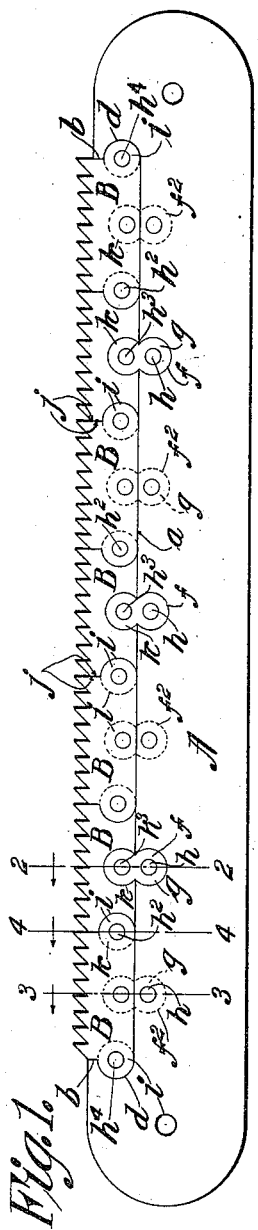
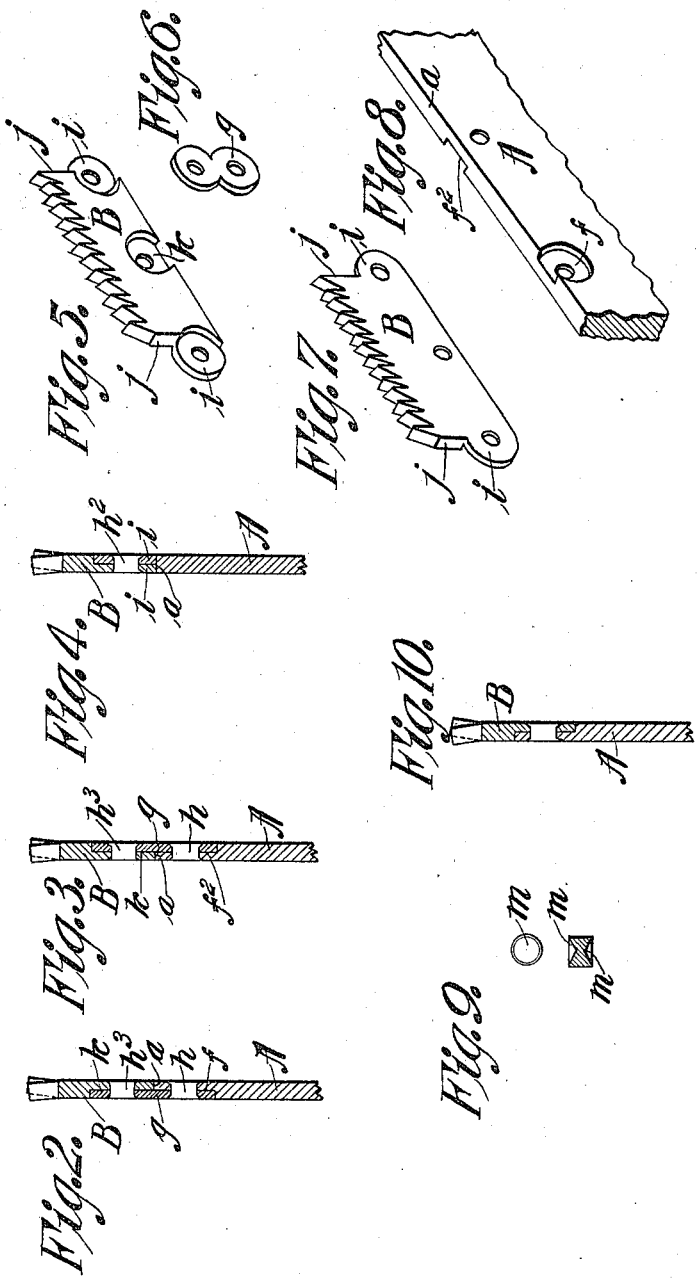
WITNESS
INVENTOR,
Amos Hutton,
BY
ATTORNEY.

UNITED STATES PATENT OFFICE.

AMOS HUTTON, OF CHICOPEE, MASSACHUSETTS.

SAW.

1,181,529.

Specification of Letters Patent.

Patented May 2, 1916.

Application filed July 26, 1915. Serial No. 41,945.

*To all whom it may concern:*

Be it known that I, AMOS HUTTON, a British subject, and resident of Chicopee, in the county of Hampden and State of Massachusetts, have invented certain new and useful Improvements in Saws, of which the following is a full, clear, and exact description.

This invention relates to a sectionally made saw blade, more especially a blade for a hack saw.

Among the various objects of the invention are the provision of a sectionally made blade which while of any desired length is absolutely straight; the provision of a blade in which the saw toothed sections are capable of being produced from high speed steel with no difficulty as regards the hardening and tempering thereof; the provision of a blade in which the back or body may be used indefinitely, the removable or interchangeable toothed sections being readily replaced as occasion therefor requires; and the provision of a saw in which by the selection or interchange of the sections a mongrel or mixed pitch combination of the teeth comprising parts may be acquired.

A further aim of the invention is to devise such formation of the interengaging members of the sectional saw that they may be produced quickly and cheaply by simple mechanical operations.

The invention is described in conjunction with the accompanying drawings and is set forth in the claims.

In the drawings:—Figure 1 shows a face view of the saw blade; Figs. 2, 3 and 4 are cross sectional views taken respectively on the lines 2—2, 3—3, and 4—4, Fig. 1. Figs. 5, 6, 7 and 8 are perspective views showing the separate parts by which the saw blade is made up in the relative arrangements of their assemblage. Fig. 9 represents a form of rivet advantageously employed in uniting the sectionally formed parts. Fig. 10 is a sectional view similar to Fig. 2, showing a modification.

In the drawings, A represents the body portion of the blade to which the saw toothed sections B B are adjoined and connected. This body portion A has an edge $a$ in a continuous line, and is formed, by widening near its end portions with shoulders $b$ $b$, in which are rebates or depressions $d$ $d$ leading to the inner boundaries of the shoulders. The said body A also has spaced depressions $f$ and $f^2$ therein leading to the longitudinal edge thereof, alternate ones $f$ thereof being within one face of the blade while the relatively intermediate, alternated ones $f^2$ are within the opposite face of the body forming portion of the blade.

$g$ $g$ represent plates of less thickness than the blade, the same being engaged in the said depressions $f$ $f^2$, and by the rivets $h$ securely fastened thereto; and the said plates project endwise beyond the edge $a$ of the blade body constituting lugs or tongues, alternated ones of which are in offset planes.

The separately formed toothed sections have at their end portions tongues or ear lugs $i$ $i$ which are of reduced thickness and comprising but portion of the width of the section, and extending beyond the ends of the portion of the section which is of the maximum width, whereby shoulders, $j$ right angular to the length of the section are formed.

Each toothed section B has a depression $k$ within its face, midway between its ends and opening to its inner edge. The said sections in combination with the blade and with each other are alternately oppositely faced as indicated in Figs. 1, 2, 3 and 5 and 7 of the drawings, so that the intermediate depressed portions $k$ thereof are matched with and engaged over the alternately offset tongue-like portions of the plate $g$ which are to all intents and purposes integral or as one with the body portion A of the blade.

The overlapped tongue-like end portions $i$ $i$ of the toothed sections are fastened together by rivets $h^2$ or equivalent connecting means; and the tongue-like portions of the plates $g$ edge wise projecting beyond the edge of the body section A and in the depressions at the middle portions of the toothed sections are connected to said sections by the rivets $h^3$ or equivalent fastenings.

The end tongues or portions of the outermost toothed sections adjoined to the aforementioned shoulders $b$ $b$ are overlapped upon the depression provided widened end portions of the blade, and by the rivets $h^4$ secured thereto.

Manifestly in place of rivets as the fastenings in the situations mentioned, small headed screws, or bolts might be employed as the equivalent of screws; and in the manufacture of the sectional saw blade mechanical skill is to be employed in order that the faces of the blade will be smooth, and all of the interengaged parts flush and continuous.

In practice I employ rivets for the fastenings such as indicated in Fig. 9, which have conical or other shaped depressions in their ends so that when upset or expanded they become outwardly flared, and will not project beyond the faces of the parts connected thereby as would be the case in the more common method of riveting by upsetting in a manner to produce heads.

It will be noted that the toothed sections B B are all counterparts or identical one with another so that there is not the trouble and necessity of the providing them in "rights" and "lefts," and the further necessity for care in their selection and assemblage.

The body portion A of the blade may be of soft, low quality steel procurable at small cost while the toothed sections may be of high speed steel or other high grade steel, and because of the size and character thereof may after the teeth have been cut and formed be hardened and tempered practicably and with uniformity. The said sections connected with the body portion A of the blade, and being endwise complemental one with the next and the end ones with the widened end portions of the body portion, and such complemental part fastened substantially as described, form a continuous working edge portion of the saw and one in which the included parts or sections brace or reinforce each other, effectually preventing buckling in an edgewise direction or warping sidewise.

The provision of the tongue-like extensions comprised in the portions of the plates *g* which edgewise project in staggered relations beyond the edge of the body member *a*, and which plates are fitted and secured in the sockets or depressions *f* therefor in the member *a*, is one conducive to easy, quick and inexpensive construction, but the lug-like members might, as represented in Fig. 10, be formed as lips or tongues formed integrally with the body section A and in the same relative arrangement as described for the extension of the separately made plates *g*.

I claim:—

1. In a saw, a blade body and separately formed sections having teeth at their outer edges, and reduced in thickness at their ends, said sections in their combination with the blade body and with each other having their inner edge portions adjoined to and along the edge portion of the blade body, and having the reduced end portions overlapped one upon the next, and fastened together, and means for connecting the toothed sections and blade body together.

2. In a saw, a blade body and separately formed sections having teeth at their outer edges, and reduced in thickness at their ends, said sections in their combination with the blade body and with each other having their inner edge portions adjoined to and along the edge portion of the blade body, and having the reduced end portions overlapped one upon the next, and fastened together, and the said body and each section having the one an edgewise projecting tongue and the other a depression for the reception therein of the tongue,—each said tongue of the one member and the depression-provided portion of the other member having uniting means therefor.

3. In a saw, a blade body having edgewise projecting tongues, and separately formed sections having teeth at their outer edges and intermediate depressions adjacent and opening to their inner edges, and reduced in thickness at their ends, said sections in their combination with the blade body and with each other having the intermediate depressed portions thereof engaged over the blade tongues and riveted thereto, and having the reduced end portions overlapped one upon the next, and riveted together.

4. In a saw, a blade body having widened and shoulder-forming portions near its ends which are formed with depressions leading to the shoulders, and separately formed sections having teeth at their outer edges, and reduced in thickness at their ends, said sections in their combination with the blade body and with each other having their inner edge portions adjoined to and along the edge portion of the blade body, and having the reduced end portions overlapped one upon the next, and fastened together, the reduced end portions of the outermost toothed sections of the series being overlapped upon and fastened to the depression-provided widened portions of the blade body, and means for connecting the inner edge portions of the toothed sections and blade body together.

5. In a saw, a blade having edgewise projecting tongues, of less thickness than the blade, alternate ones thereof having faces thereof coincident with one side face of the blade, while the relatively intermediate tongues have the side faces thereof coincident with the opposite side face of the blade, separately formed sections having teeth at their outer edges and intermediate depressions adjacent and opening to their inner edges, and reduced in thickness at their ends, said sections in their combination with the blade and with each other being alternately oppositely faced so that the intermediate depressed portions thereof are matched over the blade tongues in the different planes and riveted thereto, and having their reduced end portions overlapped one upon the next, and riveted together.

6. In a saw, a body or blade having spaced depressions therein and leading to the edge of the blade, the alternate ones thereof being within one face of the blade while the relatively intermediate ones are within the opposite face of the blade, plates of less thickness than the blade and engaged in and riveted to the depression provided portions of the blade and projecting edgewise therebeyond and a plurality of separately formed sections having teeth at their outer edges and reduced in thickness at their end portions, each having a depression intermediately of its length and opening to its inner edge, said sections in their combination with the blade and with each other being alternately opposite faced so that the intermediate depressed portions thereof are matched over the projecting tongue-like portions of said plates, and riveted thereto, and having their reduced end portions overlapped one upon the next and riveted together.

7. In a saw, a body or blade having widened shoulder forming portions near its ends which are formed with depressions leading to the shoulders and having spaced depressions therein leading to the longitudinal edge of the blade, alternate ones thereof being within one face of the blade while the relatively intermediate ones are within the opposite face of the blade, plates of less thickness than the blade engaged in and riveted to the depression provided portions of the blade and projecting edgewise therebeyond, constituting lugs or tongues alternately in offset planes, and a plurality of separately formed sections having teeth at their edges and reduced in thickness at their end portions, each having a depression intermediately of its length and opening to its inner edge, said sections in combination with the blade and with each other being alternately oppositely faced so that the intermediate depressed portions thereof are engaged over the alternately offset tongue-like portions of said plates and riveted thereto, and having their reduced end portions overlapped one upon the next and riveted together, the reduced end portions of the outermost toothed sections of the series being overlapped upon and riveted to the depression provided widened end portions of the blade.

Signed by me at Springfield, Mass., in presence of a subscribing witness.

AMOS HUTTON.

Witness:
G. R. DRISCOLL.

Copies of this patent may be obtained for five cents each, by addressing the "Commissioner of Patents, Washington, D. C."